United States Patent
Venkataraman et al.

(10) Patent No.: US 11,960,757 B2
(45) Date of Patent: Apr. 16, 2024

(54) FLASH TRANSLATION LAYER WITH REWIND

(71) Applicant: Samsung Electronics Co., Ltd., Suwon-si (KR)

(72) Inventors: Gayathiri Venkataraman, Santa Clara, CA (US); Vishwanath Maram, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 17/643,759

(22) Filed: Dec. 10, 2021

(65) Prior Publication Data

US 2023/0106882 A1 Apr. 6, 2023

Related U.S. Application Data (60) Provisional application No. 63/251,926, filed on Oct. 4, 2021.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0604; G06F 3/0655; G06F 3/0679
See application file for complete search history.

(56) References Cited

U.S. PATENT DOCUMENTS

| 5,530,673 A | 6/1996 | Tobita et al. |
| 7,275,140 B2 | 9/2007 | Paley |
| 7,519,754 B2 | 4/2009 | Wang et al. |

(Continued)

FOREIGN PATENT DOCUMENTS

| CN | 103150275 B | 12/2015 |
| KR | 10-1747791 B1 | 6/2017 |
| KR | 10-1893897 B1 | 8/2018 |

OTHER PUBLICATIONS

Gupta, A. et al., "DFTL: A Flash Translation Layer Employing Demand-based Selective Caching of Page-level Address Mappings", ASPLOS'09, Mar. 7-11, 2009, 12 pages, ACM.

(Continued)

*Primary Examiner* — Jane W Benner
(74) *Attorney, Agent, or Firm* — Lewis Roca Rothgerber Christie LLP (57) ABSTRACT

A flash translation layer with a rewind feature, and a method of operation. In some embodiments, the method includes: receiving, by a storage device, a first write command, for a first logical address; performing, by the storage device, a write to flash memory at a first physical address, corresponding to the first logical address; receiving, by the storage device, a first bookmarking command, for the first logical address; receiving, by the storage device, a second write command, for the first logical address; performing, by the storage device, a write to flash memory at a second physical address, corresponding to the first logical address; receiving, by the storage device, a first rewind command, for the first logical address; receiving, by the storage device, a read command, for the first logical address; and retrieving, by the storage device, in response to the read command, data from the first physical address.

18 Claims, 10 Drawing Sheets

(56) References Cited

U.S. PATENT DOCUMENTS

| | | | |
|---|---|---|---|
| 7,886,108 B2 | 2/2011 | Lee et al. | |
| 7,934,052 B2 | 4/2011 | Prins et al. | |
| 8,495,280 B2 | 7/2013 | Kang et al. | |
| 8,527,721 B2 | 9/2013 | Atluri et al. | |
| 9,389,792 B1 | 7/2016 | Camp et al. | |
| 9,785,575 B2 | 10/2017 | Song et al. | |
| 9,990,277 B2 | 6/2018 | Kim et al. | |
| 10,061,708 B2 | 8/2018 | Huang et al. | |
| 10,545,830 B2 | 1/2020 | Kim et al. | |
| 10,884,914 B2 | 1/2021 | Ahmed et al. | |
| 2007/0260645 A1* | 11/2007 | Augenstein | G06F 11/1471 |
| 2009/0177850 A1* | 7/2009 | Boyd | G06F 3/0659 |
| | | | 711/155 |
| 2012/0191664 A1* | 7/2012 | Wakrat | G06F 12/0246 |
| | | | 707/684 |
| 2014/0351457 A1* | 11/2014 | Baptist | H04L 69/22 |
| | | | 710/5 |
| 2020/0264973 A1 | 8/2020 | Lee | |
| 2021/0034289 A1* | 2/2021 | Dalmatov | G06F 3/0616 |
| 2021/0173776 A1 | 6/2021 | Li | |

OTHER PUBLICATIONS

Shahidi, N. et al., "CachedGC: Cache-Assisted Garbage Collection in Modern Solid State Drives", 2018 IEEE International Symposium on the Modeling, Analysis, and Simulation of Computer and Telecommunication Systems, IEEE Computer Society, 2018, pp. 79-86, IEEE.

* cited by examiner

FLASH TRANSLATION LAYER WITH REWIND

CROSS-REFERENCE TO RELATED APPLICATION(S)

The present application claims priority to and the benefit of U.S. Provisional Application No. 63/251,926, filed Oct. 4, 2021, entitled "FLASH TRANSLATION LAYER WITH REWIND FEATURE (NVME SSDS)", the entire content of which is incorporated herein by reference.

FIELD

One or more aspects of embodiments according to the present disclosure relate to persistent storage, and more particularly to a rewind feature for persistent storage with flash memory.

BACKGROUND

When data in persistent storage is overwritten by a host, the persistent storage system may implement the overwrite in an irreversible manner, e.g., the persistent storage system may store the new data and make the previously stored data unavailable. In some circumstances, however, the circumstances of the host may change so that the previously stored data are needed by the host; for example, a user may inadvertently save over a file that should have been preserved.

Thus, there is a need for a system for retrieving overwritten data from a persistent storage device.

SUMMARY

In some embodiments, a persistent storage device provides a rewind feature, allowing a host to preserve overwritten data and to return to the overwritten data using a suitable command. For example, at the time of sending to the persistent storage device a command to overwrite data, the host may instruct the persistent storage device, using a bookmarking command, to preserve the previously stored data. Subsequently, the host may instruct the persistent storage device to rewind to the previously stored value.

The persistent storage device may employ flash memory to store data, and it may, upon receiving an overwrite command (for overwriting data saved in a first physical location), save the new data in a second physical location in the flash memory, and update a logical-to-physical table so that the logical address of the overwritten data, after the updating, is mapped to the new data, in the second physical location. If the host has sent a bookmarking command (either before or with the overwrite command), the persistent storage device may copy, at the time of overwriting, the previous entry in the logical-to-physical table into a bookmark table. When the persistent storage device receives a rewind command, it may copy the entry back, from the bookmark table, into the logical-to-physical table, so that the logical address is again mapped to the first physical location.

According to an embodiment of the present disclosure, there is provided a method, including: receiving, by a storage device, a first write command, for a first logical address; performing, by the storage device, a write to flash memory at a first physical address, corresponding to the first logical address; receiving, by the storage device, a first bookmarking command, for the first logical address; receiving, by the storage device, a second write command, for the first logical address; performing, by the storage device, a write to flash memory at a second physical address, corresponding to the first logical address; receiving, by the storage device, a first rewind command, for the first logical address; receiving, by the storage device, a read command, for the first logical address; and retrieving, by the storage device, in response to the read command, data from the first physical address.

In some embodiments, the second write command includes the first bookmarking command.

In some embodiments, the method further includes: receiving, by the storage device, a third write command, for a second logical address; performing, by the storage device, a write to flash memory at a third physical address, corresponding to the second logical address; receiving, by the storage device, a second bookmarking command, for the second logical address; receiving, by the storage device, a fourth write command, for the second logical address; performing, by the storage device, a write to flash memory at a fourth physical address, corresponding to the second logical address; receiving, by the storage device, a third bookmarking command, for the second logical address; receiving, by the storage device, a fifth write command, for the second logical address; performing, by the storage device, a write to flash memory at a fifth physical address, corresponding to the second logical address; receiving, by the storage device, a fourth bookmarking command, for the second logical address; receiving, by the storage device, a second rewind command, for the second logical address; receiving, by the storage device, a read command, for the second logical address; and retrieving, by the storage device, in response to the read command, data from the fourth physical address.

In some embodiments, the method further includes copying, by the storage device, in response to the first bookmarking command, an entry from a logical-to-physical table to a bookmark table of the storage device, the entry corresponding to the first logical address.

In some embodiments, the method further includes: receiving a second bookmarking command for the first logical address; determining that a number of bookmarks stored for the first logical address equals a threshold number; and deleting the entry from the bookmark table.

In some embodiments, the method further includes: receiving a second bookmarking command for the first logical address; determining that a number of bookmarks stored for the first logical address equals a threshold number; and sending a message indicating that a maximum number of stored bookmarks has been reached.

In some embodiments, the method further includes: determining that a threshold amount of time has elapsed since the copying of the entry; and deleting the entry from the bookmark table.

In some embodiments, the method further includes copying, by the storage device, in response to the first rewind command, the entry from the bookmark table to the logical-to-physical table.

In some embodiments, the method further includes: receiving a query bookmark command; and sending a message including the first logical address and an identifier for the entry.

In some embodiments, the method further includes sending, by the storage device, in response to the first rewind command, a message indicating that previously stored data is available.

In some embodiments, the method further includes selectively performing garbage collection, by the storage device, on a plurality of blocks of the device, based on presence of bookmarked data in the blocks.

In some embodiments: the first bookmarking command is a bookmarking command for a data region of the storage device, and the storage device is configured, in response to receiving the first bookmarking command, to generate a bookmark for each write command received for the data region.

In some embodiments: the first bookmarking command is a bookmarking command for a stream, and the storage device is configured, in response to receiving the first bookmarking command, to generate a bookmark for each write command received in the stream.

According to an embodiment of the present disclosure, there is provided a system, including: a processing circuit; and persistent storage media, the processing circuit being configured to: receive a first write command, for a first logical address; perform a write to the persistent storage media at a first physical address, corresponding to the first logical address; receive a first bookmarking command, for the first logical address; receive a second write command, for the first logical address; perform a write to the persistent storage media at a second physical address, corresponding to the first logical address; receive a first rewind command, for the first logical address; receive a read command, for the first logical address; and retrieve, in response to the read command, data from the first physical address.

In some embodiments, the second write command includes the first bookmarking command.

In some embodiments, the processing circuit is further configured to copy, in response to the first bookmarking command, an entry from a logical-to-physical table to a bookmark table, the entry corresponding to the first logical address.

In some embodiments, the processing circuit is further configured to: receive a second bookmarking command for the first logical address; determine that a number of bookmarks stored for the first logical address equals a threshold number; and delete the entry from the bookmark table.

In some embodiments, the processing circuit is further configured to: receive a second bookmarking command for the first logical address; determine that a number of bookmarks stored for the first logical address equals a threshold number; and send a message indicating that a maximum number of stored bookmarks has been reached.

In some embodiments, the processing circuit is further configured to: determine that a threshold amount of time has elapsed since the copying of the entry; and delete the entry from the bookmark table.

According to an embodiment of the present disclosure, there is provided a system, including: means for processing; and persistent storage media, the means for processing being configured to: receive a first write command, for a first logical address; perform a write to the persistent storage media at a first physical address, corresponding to the first logical address; receive a first bookmarking command, for the first logical address; receive a second write command, for the first logical address; perform a write to the persistent storage media at a second physical address, corresponding to the first logical address; receive a first rewind command, for the first logical address; receive a read command, for the first logical address; and retrieve, in response to the read command, data from the first physical address.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a flash translation layer with a rewind feature provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
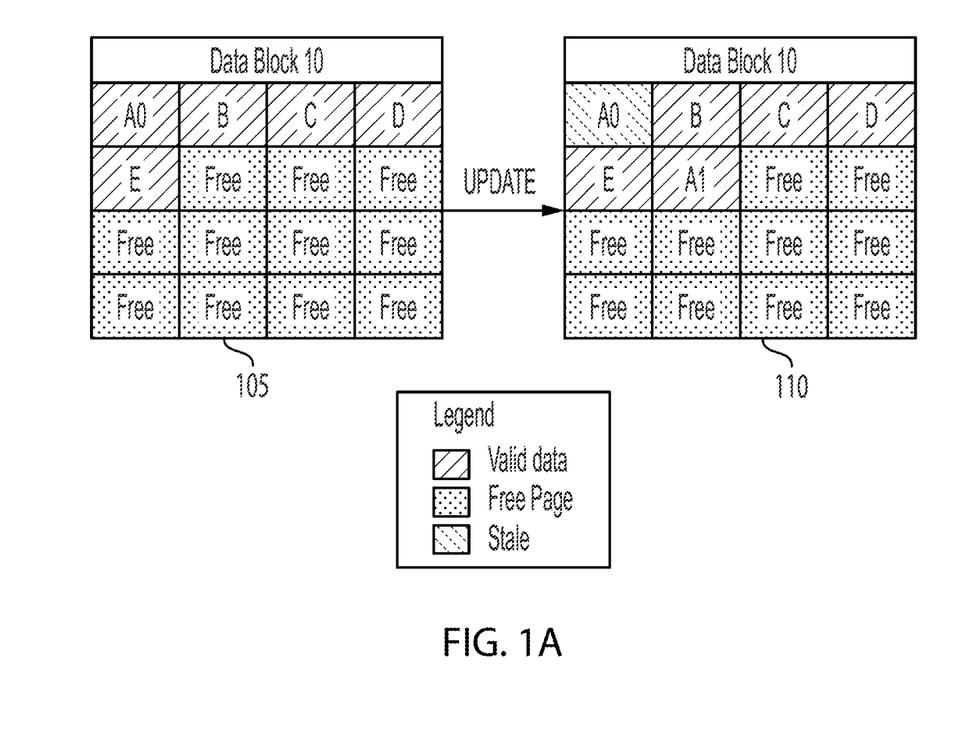
FIG. 1A is a data configuration diagram for an update, according to an embodiment of the present disclosure.

Flash-based storage may be used as a primary persistent storage solution due to its high performance and low power consumption. In such a solution, if it employs not-AND (NAND)-based persistent storage media, the persistent storage device may not allow an in-place update operation. Instead, when data stored in the NAND flash is changed, an operation called "read-modify-write" may be performed. The data are not updated in-place; instead the new data are saved to a different physical page than the page that originally contained the data. Once the new data are written to the persistent storage device, the original page is marked as being "stale", and may remain as such until it is erased. FIG. 1A illustrates this process. At 105, data are stored in pages A0, B, C, D, and E. A host sends new data to be written over page A0; in response the persistent storage device looks up a free page, writes the new data to the free page A1, and marks page A0 as stale, as shown in 110.

Figure 1B:
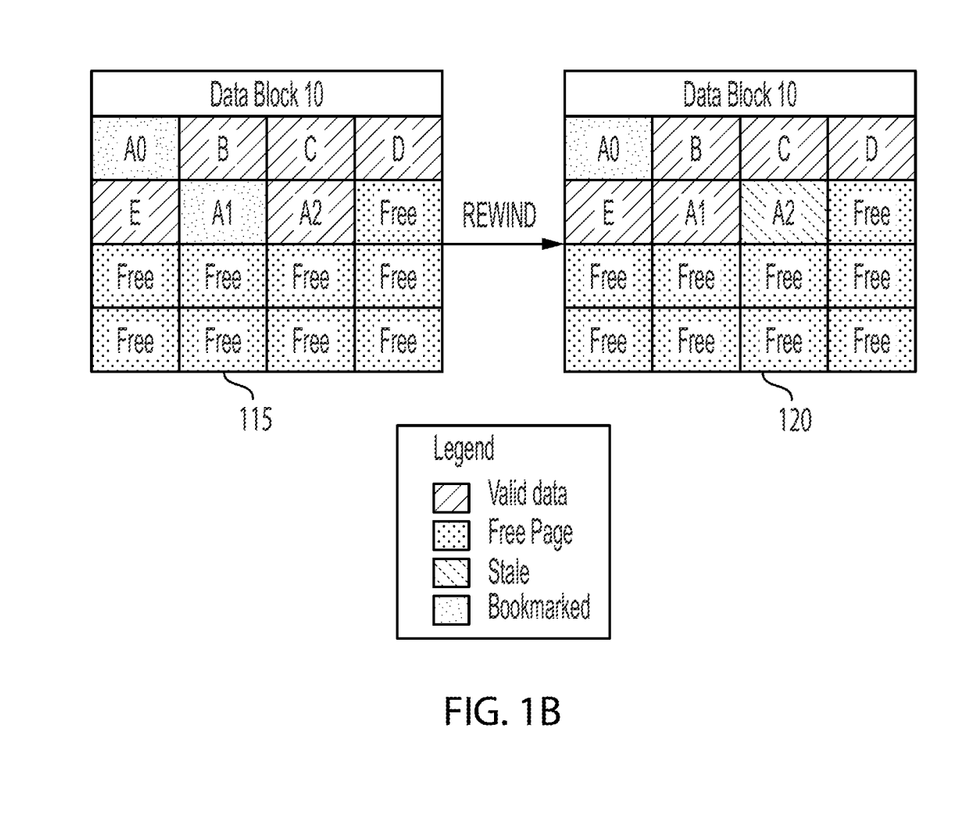
FIG. 1B is a data configuration diagram for rewind, according to an embodiment of the present disclosure.

In some embodiments, it is possible to reuse this stale data, e.g., for data recovery or for error investigation. This feature, which may be referred to as a "rewind" feature, enables the host or application to return a page to its state at a time in the recent past. A framework for providing this capability may work as follows. The host may enable the rewind feature, configure the time window to retain the data, and instruct (by sending it a suitable bookmarking command) the persistent storage device to "bookmark", or preserve for future access, certain stale pages. The stale pages can then be reused to re-construct the data. The flash translation layer (FTL) garbage collection may then avoid reclaiming these blocks (the blocks containing bookmarked stale pages) during the time window. These features may be enabled by the flash translation layer (which may be implemented in internal software of the persistent storage device). FIG. 1B illustrates this process. At 115, pages A0 and A1 have been bookmarked, and replaced with page A2, which contains the most recent data. The host may then instruct the persistent storage device to rewind to A1, which is then marked, by the persistent storage device, as valid, and page A2 may then be marked as stale, as shown at 120.

A persistent storage device, such as a solid-state drive (SSD), may be a data storage device, using integrated circuit assemblies (e.g., NAND flash integrated circuits) as memory to store data persistently. The flash translation layer may be a software layer running in the SSD controller (a processing circuit in the SSD), which allows the host to read and write to NAND flash memory devices. Data may be written to the flash memory in units called pages. The flash memory may be erased before it can be rewritten; however, the flash memory may only be capable of being erased in larger units referred to as "blocks", each including a plurality of pages. NAND flash memory may have relatively long erase times. Instead of erasing a block to be able to rewrite it, the flash translation layer may write the data to another physical page and mark the data contained in the previous physical page as invalid (stale). The garbage collection process ensures that "stale" pages are erased and restored into a "free" state so that incoming write commands may be processed.

In some systems, data recovery is only performed at the application level, and may involve restoring data (moving potentially large amounts of data) from a backup or mirror to the primary store. Such a solution for recovering overwritten data may be expensive, slow, and less secure than a rewind capability as disclosed herein. By contrast, the use of a rewind feature may significantly minimize application downtime, be significantly faster (as a result of not involving data movement), and reduce the degree of host and application intervention required to manage data (e.g., it may offload or avoid check pointing from the host or applications). In providing recovery from data loss the use of a rewind feature may provide a self-recovery feature for the host and for applications at various levels, it may recover critical data from logical data corruption (such as an accidental deletion of data), and it may recover from shrink operations that may be performed on data abstractions (such as volumes, files, etc.). Further, a rewind feature may be a diagnostic tool for error investigations, making it possible to go back to a previous point in time. For SSDs, the use of a rewind feature may also result in fewer disk erasures and lower write amplification, and hence an increase in the life of the SSD.

Figure 2A:
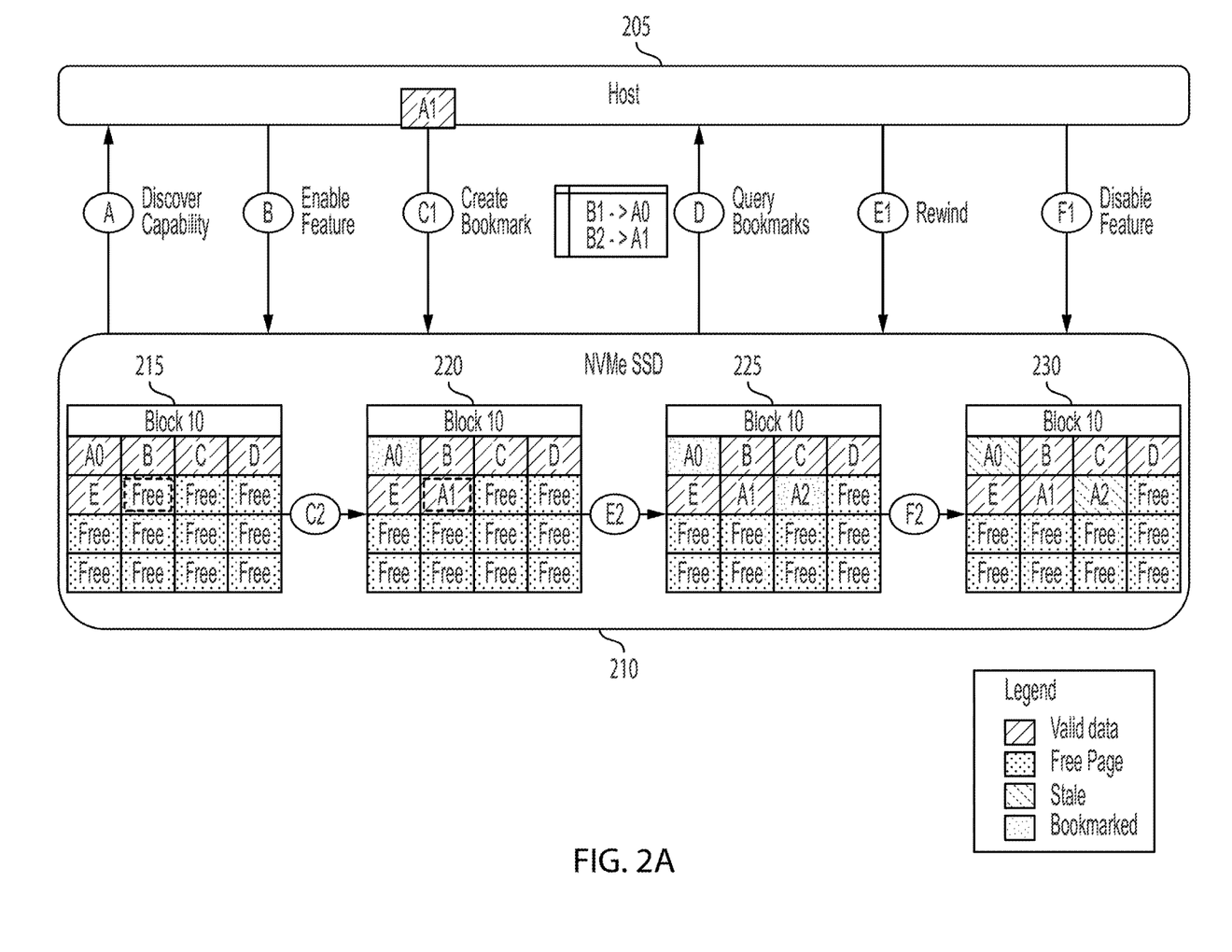
FIG. 2A is a block diagram of a host and persistent storage device, showing bookmarking and rewind operations, according to an embodiment of the present disclosure.

A persistent storage device with a rewind capability may provide the following functions to a host (as discussed in further detail below): discovery, enable rewind feature, create bookmark, query bookmarks, rewind, and disable rewind feature. The various commands may be implemented as NVMe set feature commands. When performing discovery, the host may query the persistent storage device to determine whether it supports the rewind feature, and the persistent storage device may respond in the affirmative if it does. This set of functions is illustrated in FIG. 2A. A host 205 first uses the discovery feature, at A, to determine that the persistent storage device 210 supports the rewind feature, at B, the host 205 sends a command to the storage device 210 to enable the rewind feature, and, in response, the storage device 210 enables the rewind feature. At C1 the host 205 sends a command to the storage device 210 to overwrite page A0 with new page A1, and to create a bookmark for page A0, and, in response, the storage device 210 stores new page A1 and creates a bookmark for page A0, changing the initial data configuration (shown at 215) in the block to that shown at 220. At D, the host 205 queries the bookmarks. The host overwrites A1 with A2 and bookmarks A1. At E1, the host 205 sends a command to the persistent storage device 210 to rewind to the bookmark for A1, and, in response, the persistent storage device 210 creates the data configuration at 225. Finally the host sends a feature disable command and in response the persistent storage device 210 marks blocks A0 and A2 as stale, creating the data configuration at 230. Each of the labels C2, E2, and F2 shows a transition to the next stage, performed by the storage device 210 in response to a command received from the host 205. Some embodiments may work with various FTL mapping implementations (hybrid mapping, block level mapping etc.).

When the host uses the enable feature function, the rewind feature may be enabled within "data regions" defined by various data boundaries, e.g., for a namespace, for a stream, or for individual logical block addresses (LBAs). As used herein, a "data region" is a subset of the data storage capacity of the storage device 210, such as a namespace, a set of LBAs, or a set of pages. The rewind feature may be enabled for a limited time window (so that, e.g., bookmarks are retained for a day) or until a threshold number of bookmarks is reached (so that, e.g., no more than 10 bookmarks are retained). If a bookmarking command is received when the maximum number of bookmarks has been reached, the persistent storage device may delete the oldest bookmark, or (i) respond with a message notifying the host that the maximum number of bookmarks has been reached, and (ii) disregard the bookmarking command. The NVMe Set feature command may be used to enable or disable the rewind capability.

Figure 2B:
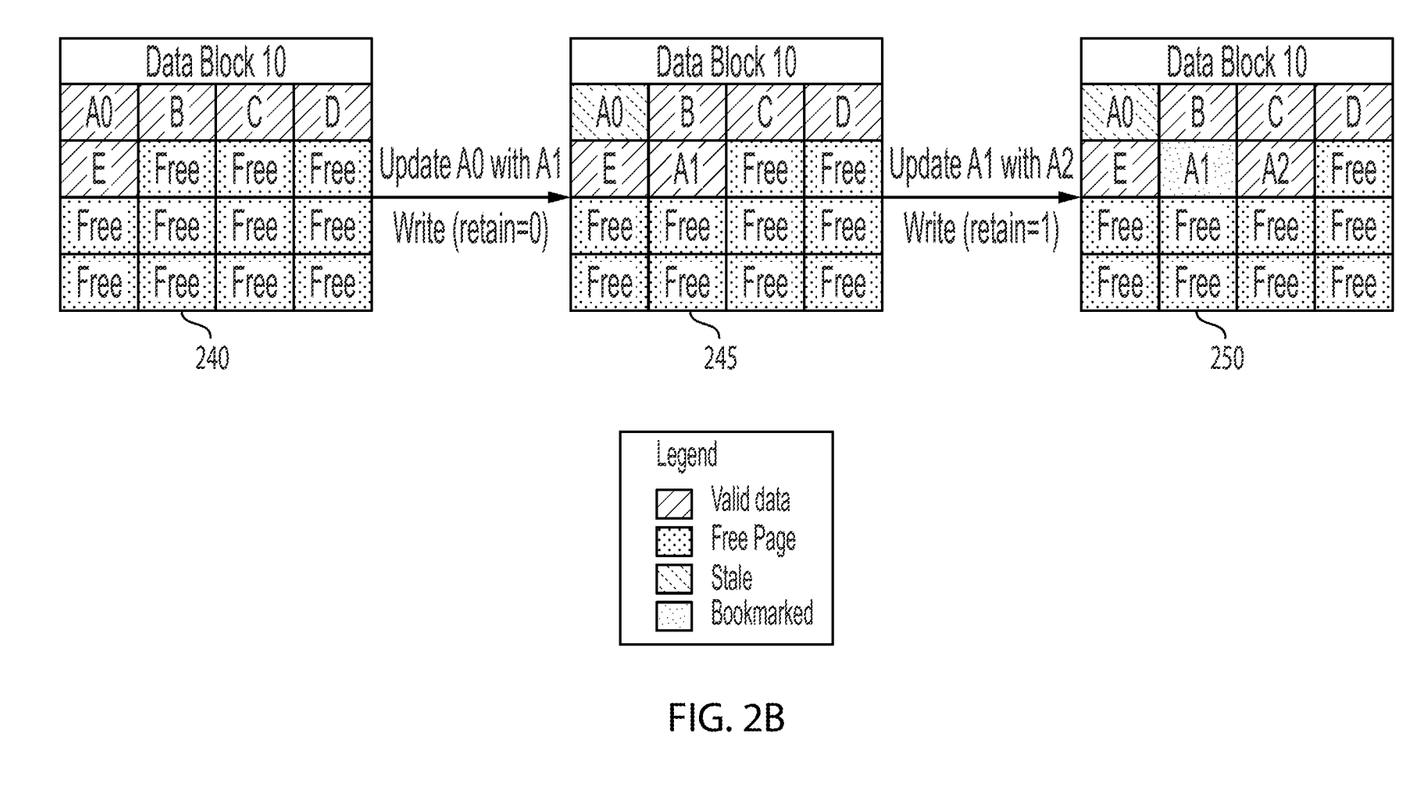
FIG. 2B is a data configuration diagram for updating with bookmarking, according to an embodiment of the present disclosure.

When the host uses the create bookmarks feature, a write command may include an additional flag to indicate that old data are to be retained (i.e., the bookmarking command may be included in the write command). If the bit is set, then the old data are marked with a "bookmark" (discussed in further detail below). If the bit is unset, then the old data are marked as stale and the garbage collection process will act on the old data as it ordinarily would. The flash translation layer may use an efficient data structure (e.g., a hash, a log-structured merge-tree (LSM tree), etc.) (referred as a bookmark table) to store the bookmarks. The bookmark table may store the old logical-to-physical mapping for the page being modified after having been bookmarked. This process is illustrated in FIG. 2B. In FIG. 2B, the initial data configuration in the block is shown at 240, the configuration after page A0 has been overwritten with page A1 (without bookmarking page A0, so that page A0 becomes stale) is shown at 245, and the configuration after page A1 has been bookmarked and overwritten with page A2 is shown at 250. In some embodiments, the host may send to the storage device 210 a bookmarking command (which may be referred to as a "general" bookmarking command) having the effect of causing the storage device to generate a bookmark for every write command it receives to which the general bookmarking command applies. For example, the general bookmarking command may apply to a data region (and cause the storage device to generate a bookmark for every write command it receives for a write within the data region) or the general bookmarking command may apply to a stream (and cause the storage device to generate a bookmark for every write command it receives in the stream).

When the host uses the query bookmarks feature, the persistent storage device may return the currently stored bookmarks, or a subset of the currently stored bookmarks. For example, the query may return a dataset as follows:

((LBA1, Bookmark[1 . . . n]) . . . (LBAn, Bookmark[1 . . . n]))

which includes a list of bookmarks for each of a plurality of LBAs. Each such bookmark may be identified by an identifier, e.g., an integer identifier or a date and time of creation.

Figure 2C:
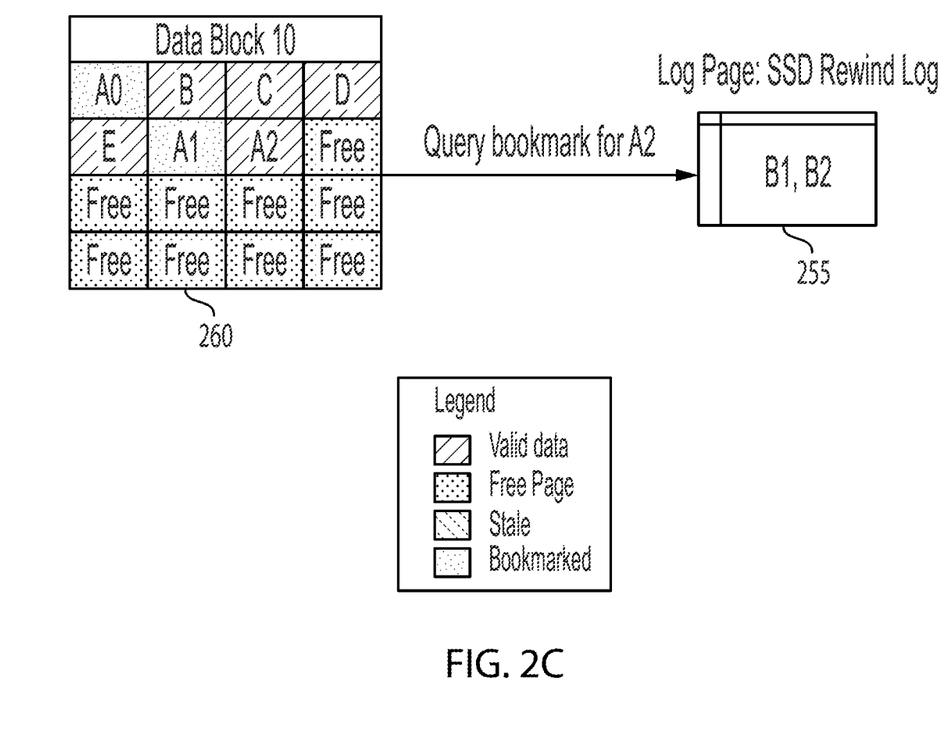
FIG. 2C is a data configuration diagram for a query bookmarks operation, according to an embodiment of the present disclosure.

If the interface to the persistent storage device is non-volatile memory express (NVMe) then the NVMe Get Log Page command may be used to query the bookmarks, using the following parameters:

Log Page Identifier (LID): SSD Rewind Log
Log Specific Field (LSP): Stream Id, LBA or Namespace Id The query bookmarks feature is illustrated in FIG. 2C. In response to the query bookmarks command, the persistent storage device reports, to the host, a list of bookmarks 255 corresponding to the current data configuration 260. The list of bookmarks may include all of the stored bookmarks, or a subset of the stored bookmarks (e.g., the bookmarks for a namespace, or for an LBA, or for a logical page (e.g., the page A2 illustrated in the example of FIG. 2C).

Figure 2D:
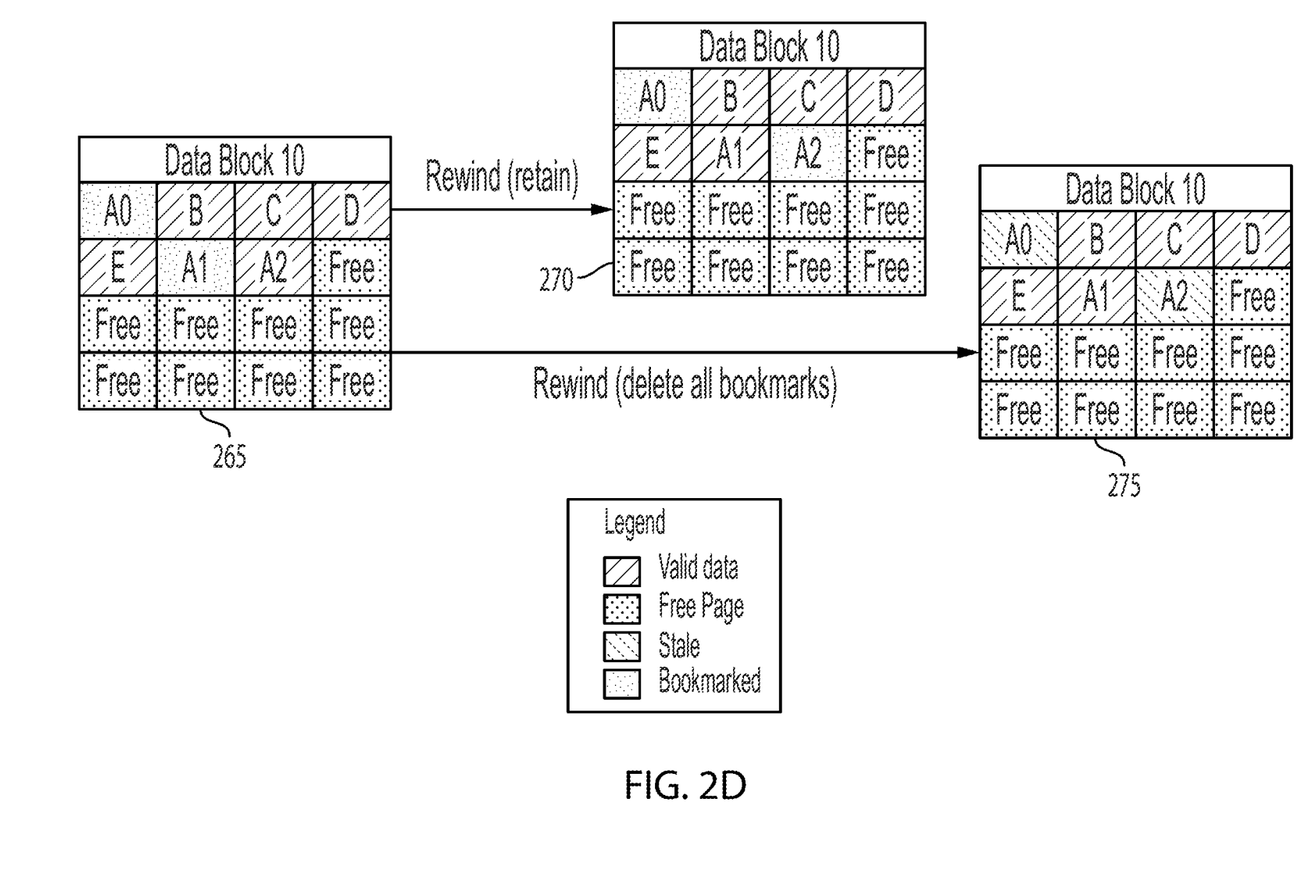
FIG. 2D is a data configuration diagram for two different rewind commands, according to an embodiment of the present disclosure.

When the host uses the rewind feature, the data may be reverted to an active bookmark (of the active bookmarks) specified by the host. The rewind command may take an additional flag to (i) retain all old bookmarks (ii) delete all bookmarks (iii) delete all bookmarks prior to the bookmark being reverted to or (iv) delete all bookmarks after the proposed bookmark. Upon receipt of a rewind command, the persistent storage device may send a message to the host indicating whether the previously stored data is available (e.g., whether the bookmark, to which the rewind is requested, is present in the bookmark table). The rewind feature is illustrated in FIG. 2D, with an initial data configuration shown at 265. When rewinding from page A2 to bookmarked page A1, the data configuration becomes that shown at 270 if the rewind is performed while retaining the bookmarks, and the data configuration becomes that shown at 275 if the rewind is performed while deleting the bookmarks.

When the host uses the disable feature, the rewind feature may be disabled (e.g., for an LBA range, for a multi stream, or for a namespace) that has been previously set for rewind. The disable feature may take additional flags (i) to retain all bookmarks created so far, or (ii) to delete all existing bookmarks. For example, the NVMe Set Feature command may be used to disable the rewind feature.

When the host uses the read data from bookmarks feature, the persistent storage device may return data in one or more page identified and preserved by a bookmark in the bookmark table. This feature may take several flags indicating whether to read (i) valid data and all the prior bookmarked data, (ii) valid data and a specific bookmarked data, or (iii) any given bookmarked data. For example, the NVMe Read command may be used to read data from bookmarks.

Figure 3A:
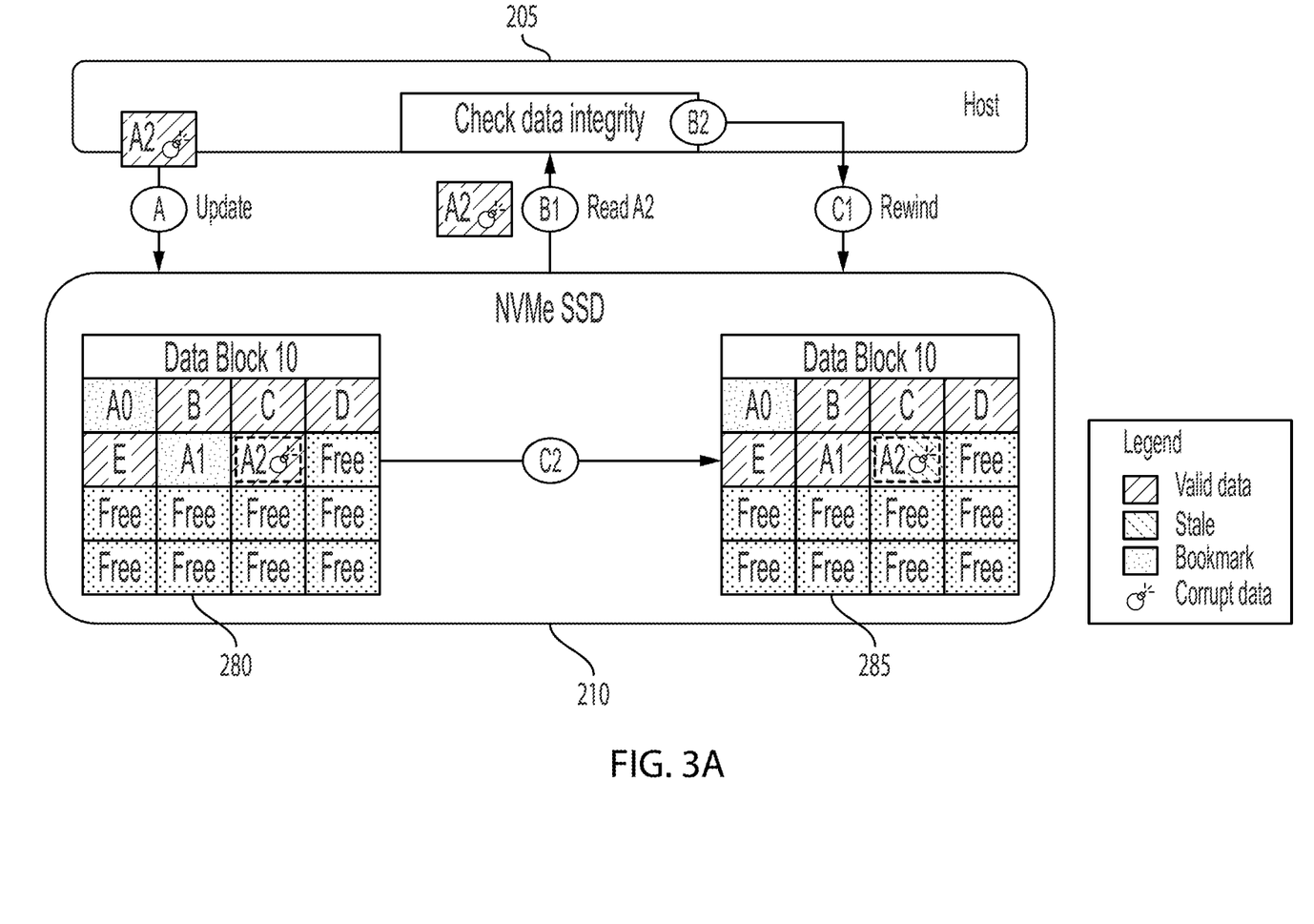
FIG. 3A is a block diagram of a host and persistent storage device, showing a data recovery operation, according to an embodiment of the present disclosure.

FIG. 3A shows one example of a use case of a rewind feature, in data recovery. In this use case, the host 205 may accidentally overwrite A1 with corrupt data A2, resulting in the data configuration shown at 280. The host 205 may check data integrity by reading data A2, running a data integrity test on A2, and determining that the data integrity test has failed. The host 205 may then issue a rewind command of A2. In some embodiments it may be the storage device 210 that (i) checks the data integrity, (ii) determines that the data integrity test has failed, and (iii) in response to determining that the data integrity test has failed, issues a rewind command of A2. The persistent storage device 210 may then restore A1 and mark A2 as stale, resulting in the data configuration shown at 285.

Figure 3B:
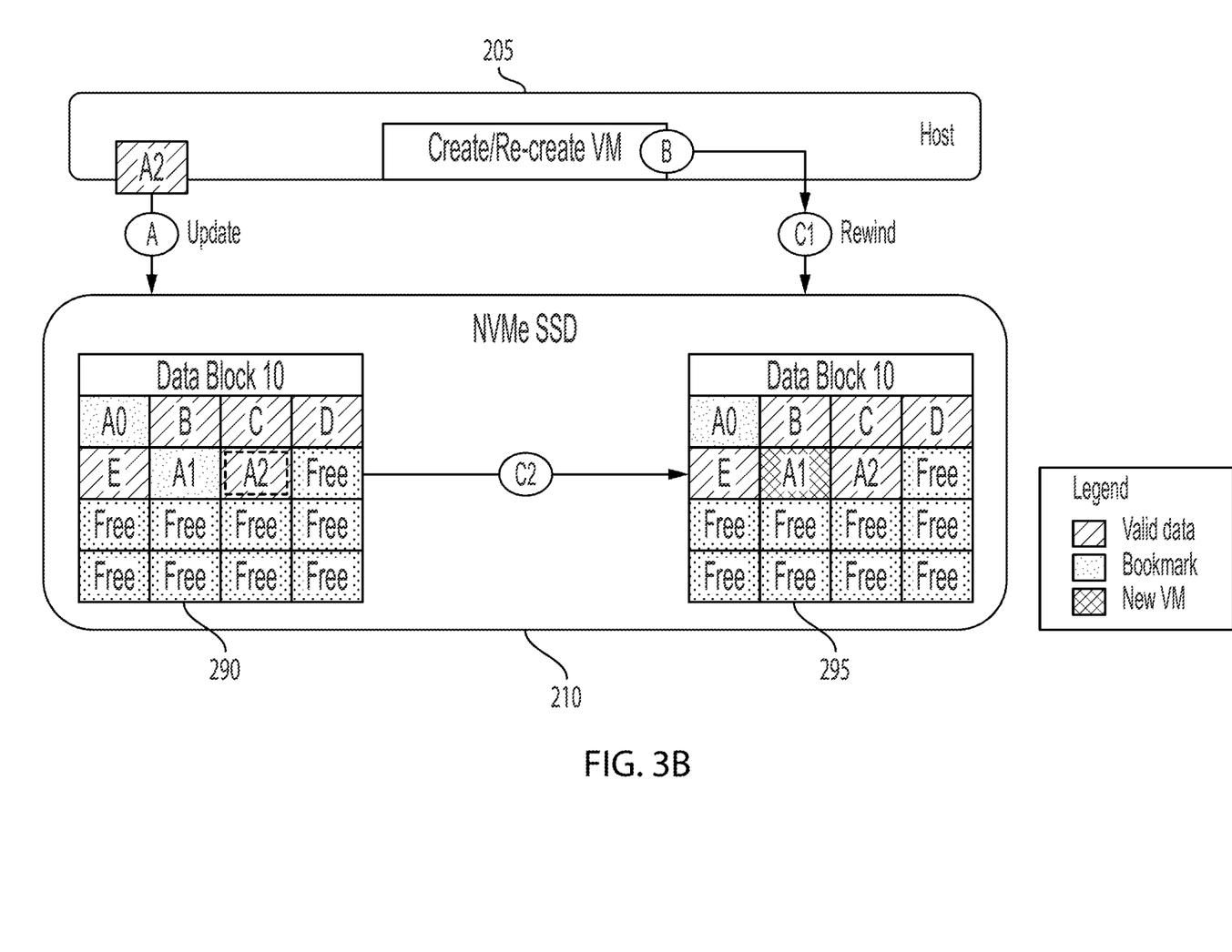
FIG. 3B is a block diagram of a host and persistent storage device, showing a testing and deployment operation, according to an embodiment of the present disclosure.

FIG. 3B shows another example of a use case of a rewind feature, in testing and deployment. In this use case, the host 205 may first write page A1 with a new image for a virtual machine (VM), bookmark A1, and create a new virtual machine using this image. As the virtual machine runs (e.g., with input from a user), it may generate a modified image (e.g., including modified database tables) A2. If, for example, as a result of user error, the data in A2 become corrupted, the host 205 may then issue a rewind of A2, in response to which the persistent storage device 210 restores A1 as valid, resulting in the data configuration shown at 295 (with no data movement or copying of data involved), and the host may then again create a new VM, using this restored image.

Figure 4:
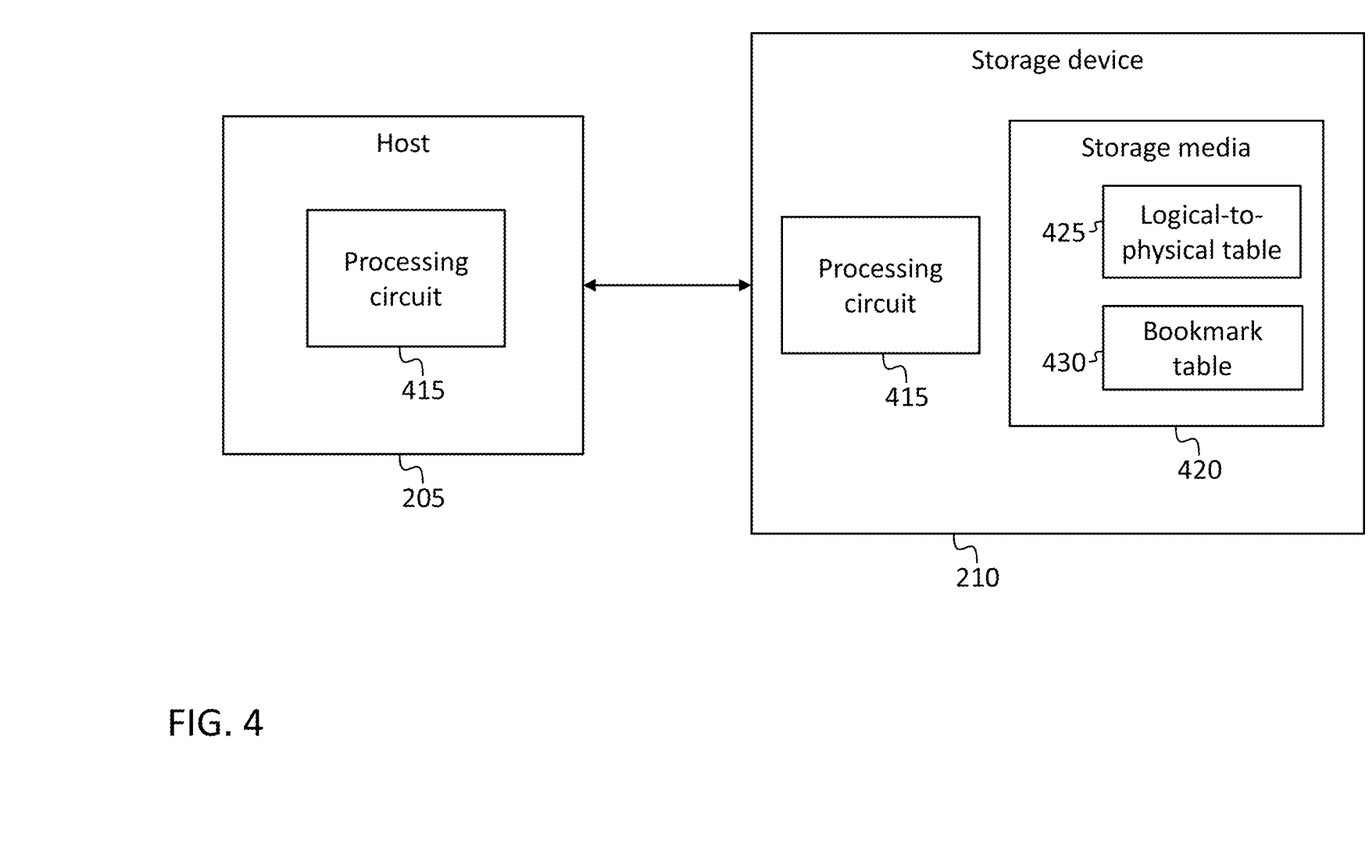
FIG. 4 is a block diagram of a host and persistent storage device, according to an embodiment of the present disclosure.

FIG. 4 is a block diagram of a host 205 and a persistent storage device 210 (which may be an SSD). The storage device 210 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 205, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS). Each of the host 205 and the storage device 210 may include a processing circuit 415 (discussed in further detail below). The storage device 210 may also include persistent storage media 420 (e.g., NAND flash), in which may be stored the logical-to-physical table 425 and the bookmark table 430. The processing circuit 415 of the storage device 210 may perform (and, using the processing circuit 415 that it contains, the storage device 210 may perform) some or all of the methods described herein.

Figure 5:
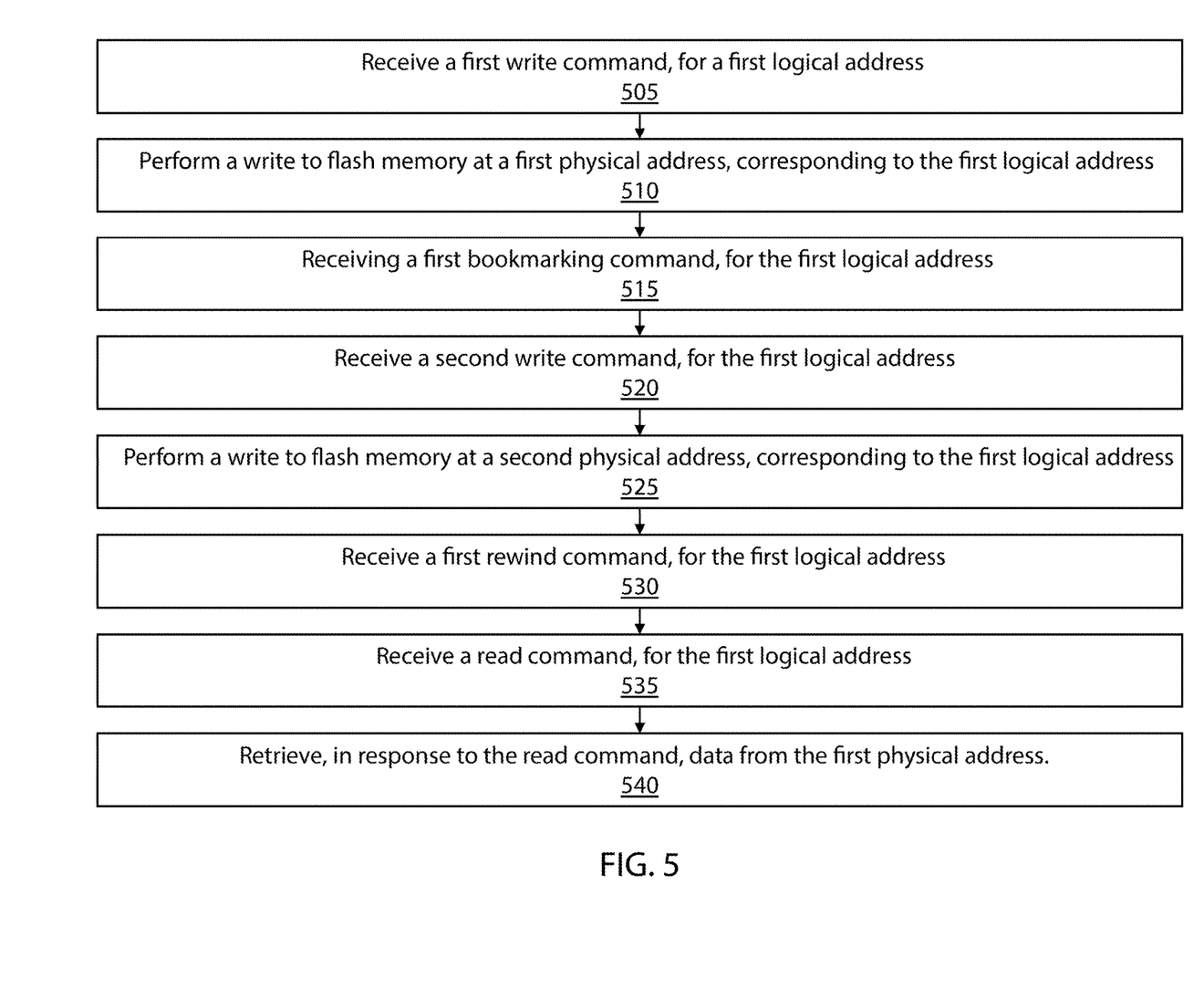
FIG. 5 is a flowchart of a method, according to an embodiment of the present disclosure.

The flowchart of FIG. 5 shows an example of a method, including receiving, at 505, by a storage device, a first write command, for a first logical address; performing, at 510, by the storage device, a write to flash memory at a first physical address, corresponding to the first logical address; receiving, at 515, by the storage device, a first bookmarking command, for the first logical address; receiving, at 520, by the storage device, a second write command, for the first logical address; performing, at 525, by the storage device, a write to flash memory at a second physical address, corresponding to the first logical address; receiving, at 530, by the storage device, a first rewind command, for the first logical address; receiving, at 535, by the storage device, a read command, for the first logical address; and retrieving, at 540, by the storage device, in response to the read command, data from the first physical address.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B". As used herein, the term "array" refers to an ordered set of numbers regardless of how stored (e.g., whether stored in consecutive memory locations, or in a linked list).

The background provided in the Background section of the present disclosure section is included only to set context, and the content of the Background section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a flash translation layer with a rewind feature have been specifically described and illustrated herein, many modifications and variations will be apparent to those skilled in the art. Accordingly, it is to be understood that a flash translation layer with a rewind feature constructed according to principles of this disclosure may be embodied other than as specifically described herein. The invention is also defined in the following claims, and equivalents thereof.

What is claimed is:

1. A method, comprising:
receiving, by a storage device, a first write command, for a first logical address;
performing, by the storage device, a write to flash memory at a first physical address, corresponding to the first logical address;
receiving, by the storage device, a first bookmarking command, for the first logical address;
copying, by the storage device, in response to the first bookmarking command, an entry from a logical-to-physical table to a bookmark table of the storage device, the entry corresponding to the first logical address;
receiving, by the storage device, a second write command, for the first logical address;
performing, by the storage device, a write to flash memory at a second physical address, corresponding to the first logical address;
receiving, by the storage device, a first rewind command, for the first logical address;
receiving, by the storage device, a read command, for the first logical address; and
retrieving, by the storage device, in response to the read command, data from the first physical address.

2. The method of claim 1, wherein the second write command comprises the first bookmarking command.

3. The method of claim 1, further comprising:
receiving, by the storage device, a third write command, for a second logical address;
performing, by the storage device, a write to flash memory at a third physical address, corresponding to the second logical address;
receiving, by the storage device, a second bookmarking command, for the second logical address;
receiving, by the storage device, a fourth write command, for the second logical address;
performing, by the storage device, a write to flash memory at a fourth physical address, corresponding to the second logical address;
receiving, by the storage device, a third bookmarking command, for the second logical address;
receiving, by the storage device, a fifth write command, for the second logical address;
performing, by the storage device, a write to flash memory at a fifth physical address, corresponding to the second logical address;
receiving, by the storage device, a fourth bookmarking command, for the second logical address;
receiving, by the storage device, a second rewind command, for the second logical address;
receiving, by the storage device, a read command, for the second logical address; and
retrieving, by the storage device, in response to the read command, data from the fourth physical address.

4. The method of claim 1, further comprising:
receiving a second bookmarking command for the first logical address;
determining that a number of bookmarks stored for the first logical address equals a threshold number; and
deleting the entry from the bookmark table.

5. The method of claim 1, further comprising:
receiving a second bookmarking command for the first logical address;
determining that a number of bookmarks stored for the first logical address equals a threshold number; and
sending a message indicating that a maximum number of stored bookmarks has been reached.

6. The method of claim 1, further comprising:
determining that a threshold amount of time has elapsed since the copying of the entry; and
deleting the entry from the bookmark table.

7. The method of claim 1, further comprising copying, by the storage device, in response to the first rewind command, the entry from the bookmark table to the logical-to-physical table.

8. The method of claim 1, further comprising:
receiving a query bookmark command; and
sending a message including the first logical address and an identifier for the entry.

9. The method of claim 1, further comprising sending, by the storage device, in response to the first rewind command, a message indicating that previously stored data is available.

10. The method of claim 1, further comprising selectively performing garbage collection, by the storage device, on a plurality of blocks of the device, based on presence of bookmarked data in the blocks.

11. The method of claim 1, wherein:
the first bookmarking command is a bookmarking command for a data region of the storage device, and
the storage device is configured, in response to receiving the first bookmarking command, to generate a bookmark for each write command received for the data region.

12. The method of claim 1, wherein:
the first bookmarking command is a bookmarking command for a stream, and
the storage device is configured, in response to receiving the first bookmarking command, to generate a bookmark for each write command received in the stream.

13. A system, comprising:
a processing circuit; and
persistent storage media,
the processing circuit being configured to:
receive a first write command, for a first logical address;
perform a write to the persistent storage media at a first physical address, corresponding to the first logical address;
receive a first bookmarking command, for the first logical address;
copy, in response to the first bookmarking command, an entry from a logical-to-physical table to a bookmark table, the entry corresponding to the first logical address;
receive a second write command, for the first logical address;
perform a write to the persistent storage media at a second physical address, corresponding to the first logical address;
receive a first rewind command, for the first logical address;
receive a read command, for the first logical address; and
retrieve, in response to the read command, data from the first physical address.

14. The system of claim 13, wherein the second write command comprises the first bookmarking command.

15. The system of claim 13, wherein the processing circuit is further configured to:
receive a second bookmarking command for the first logical address;

determine that a number of bookmarks stored for the first logical address equals a threshold number; and
delete the entry from the bookmark table.

16. The system of claim 13, wherein the processing circuit is further configured to:
receive a second bookmarking command for the first logical address;
determine that a number of bookmarks stored for the first logical address equals a threshold number; and
send a message indicating that a maximum number of stored bookmarks has been reached.

17. The system of claim 13, wherein the processing circuit is further configured to:
determine that a threshold amount of time has elapsed since the copying of the entry; and
delete the entry from the bookmark table.

18. A system, comprising:
means for processing; and
persistent storage media,
the means for processing being configured to:
receive a first write command, for a first logical address;
perform a write to the persistent storage media at a first physical address, corresponding to the first logical address;
receive a first bookmarking command, for the first logical address;
copy, in response to the first bookmarking command, an entry from a logical-to-physical table to a bookmark table, the entry corresponding to the first logical address;
receive a second write command, for the first logical address;
perform a write to the persistent storage media at a second physical address, corresponding to the first logical address;
receive a first rewind command, for the first logical address;
receive a read command, for the first logical address; and
retrieve, in response to the read command, data from the first physical address.

\* \* \* \* \*